United States Patent
Davi et al.

(10) Patent No.: US 9,038,354 B2
(45) Date of Patent: May 26, 2015

(54) MACHINE FOR PACKAGING ARTICLES INSIDE CONTAINERS

(75) Inventors: Daniele Davi, Ferrara (IT); Michele Pallara, Ferrara (IT)

(73) Assignee: CT PACK S.r.l. (IT)

(*) Notice: Subject to any disclaimer, the term of this patent is extended or adjusted under 35 U.S.C. 154(b) by 407 days.

(21) Appl. No.: 13/193,798

(22) Filed: Jul. 29, 2011

(65) Prior Publication Data

US 2012/0023867 A1 Feb. 2, 2012

(30) Foreign Application Priority Data

Jul. 30, 2010 (IT) .............................. BO2010A0489

(51) Int. Cl.
| | |
|---|---|
| B65G 17/06 | (2006.01) |
| B65B 5/10 | (2006.01) |
| B65B 25/00 | (2006.01) |
| B65B 35/24 | (2006.01) |
| B65G 17/12 | (2006.01) |
| B65G 17/32 | (2006.01) |

(Continued)

(52) U.S. Cl.
CPC .............. *B65G 17/065* (2013.01); *B65B 5/105* (2013.01); *B65B 25/007* (2013.01); *B65B 35/24* (2013.01); *B65B 57/10* (2013.01); *B65B 65/08* (2013.01); *B65G 17/12* (2013.01); *B65G 17/32* (2013.01); *B65G 2201/0202* (2013.01)

(58) Field of Classification Search
CPC ............ B65B 3/56; B65B 25/007; B65B 5/08
USPC ........... 53/493, 498, 544, 142, 143, 244, 251; 198/867.11, 867.15, 803.14, 850, 853
See application file for complete search history.

(56) References Cited

U.S. PATENT DOCUMENTS

| | | | | |
|---|---|---|---|---|
| 316,172 | A | * | 4/1885 | Potts ........................ 198/803.11 |
| 2,074,383 | A | * | 3/1937 | Funk ............................. 414/414 |
| 2,326,146 | A | * | 8/1943 | Kurzbin .......................... 53/142 |

(Continued)

FOREIGN PATENT DOCUMENTS

| | | |
|---|---|---|
| EP | 0856465 | 8/1998 |
| FR | 1240729 | 9/1960 |

OTHER PUBLICATIONS

Italian Search Report dated Jul. 8, 2011 from counterpart foreign application.

(Continued)

*Primary Examiner* — Stephen F Gerrity
*Assistant Examiner* — Eyamindae Jallow
(74) *Attorney, Agent, or Firm* — Timothy J. Klima; Shuttleworth & Ingersoll, PLC

(57) ABSTRACT

Machine (1) for packaging articles (2) inside containers (3), a conveyor (6) is provided with a longitudinally movable transporting section (7) for feeding the articles (2) in a given direction (D) and along a given conveying path (P); a robot (23), which is arranged along the conveying path (P) and controlled by an operating and control device depending on detection at least of the position of each article (2) on the transporting section (7), picks up single articles (2) from the transporting section (7) and transfers each picked-up article (2) inside a container (3); the transporting section (7) is delimited transversely by two side walls (18) stabilizing the position and direction of each article (2) with respect to the transporting section (7); on the latter the articles (2) are stably seated between the side walls (18), one behind another in a row, in the conveying direction (D).

13 Claims, 3 Drawing Sheets

(51) Int. Cl.
  *B65B 57/10* (2006.01)
  *B65B 65/08* (2006.01)

(56) References Cited

U.S. PATENT DOCUMENTS

| | | | | |
|---|---|---|---|---|
| 2,954,113 | A * | 9/1960 | Hibbard et al. | 198/867.15 |
| 3,138,239 | A * | 6/1964 | Ackerman et al. | 198/562 |
| 3,169,354 | A * | 2/1965 | Page et al. | 53/499 |
| 3,171,367 | A * | 3/1965 | Carter et al. | 426/282 |
| 3,236,374 | A * | 2/1966 | Zimmerman et al. | 209/573 |
| 3,504,785 | A * | 4/1970 | Gartner | 198/711 |
| 3,630,340 | A * | 12/1971 | Bouzat et al. | 198/847 |
| 3,800,937 | A * | 4/1974 | Tassie | 198/803.14 |
| 4,000,568 | A * | 1/1977 | Donkers | 37/338 |
| 4,188,768 | A * | 2/1980 | Getman | 53/282 |
| 4,507,908 | A * | 4/1985 | Seragnoli | 53/498 |
| 4,600,591 | A * | 7/1986 | Galli | 426/94 |
| 4,694,637 | A | 9/1987 | Bech et al. | |
| 4,819,791 | A * | 4/1989 | Melander | 198/818 |
| 4,844,236 | A * | 7/1989 | Kraus | 198/690.2 |
| 4,899,866 | A * | 2/1990 | Colamussi | 198/418.1 |
| 4,965,981 | A * | 10/1990 | Kikuchi | 53/142 |
| 5,228,267 | A * | 7/1993 | Blankenship et al. | 53/397 |
| 5,298,425 | A * | 3/1994 | Kuhn et al. | 436/43 |
| 5,339,938 | A * | 8/1994 | Patin | 198/334 |
| 5,434,428 | A * | 7/1995 | Paladini | 250/559.24 |
| 5,761,883 | A * | 6/1998 | Pruett et al. | 53/448 |
| 5,768,856 | A * | 6/1998 | Odenthal | 53/443 |
| 5,829,577 | A * | 11/1998 | Grisley | 198/811 |
| 5,839,569 | A | 11/1998 | Spindler et al. | |
| 5,855,105 | A * | 1/1999 | Ferris | 53/475 |
| 5,915,524 | A * | 6/1999 | Horlacher | 198/473.1 |
| 5,947,262 | A * | 9/1999 | Boring et al. | 198/803.1 |
| 6,122,895 | A * | 9/2000 | Schubert | 53/55 |
| 6,158,575 | A * | 12/2000 | Hitz | 198/803.14 |
| 6,349,526 | B1 * | 2/2002 | Newman | 53/446 |
| 6,363,686 | B1 * | 4/2002 | Heide | 53/53 |
| 6,415,582 | B2 * | 7/2002 | Graushar et al. | 53/411 |
| 6,546,697 | B2 * | 4/2003 | Handel et al. | 53/443 |
| 6,591,977 | B2 * | 7/2003 | Spencer et al. | 198/836.2 |
| 6,631,799 | B2 * | 10/2003 | Samson | 198/771 |
| 6,901,726 | B2 * | 6/2005 | Huppi et al. | 53/473 |
| 7,484,923 | B2 * | 2/2009 | Haas et al. | 414/795.6 |
| 7,828,136 | B2 * | 11/2010 | Damkjaer | 198/853 |
| 7,918,334 | B2 * | 4/2011 | Gaetano et al. | 198/867.12 |
| 8,015,778 | B2 * | 9/2011 | Tischhauser | 53/475 |
| 2002/0079199 | A1 * | 6/2002 | Wipf et al. | 198/803.3 |
| 2002/0175051 | A1 * | 11/2002 | Samson | 198/550.01 |
| 2003/0034234 | A1 * | 2/2003 | Neumann | 198/840 |
| 2003/0079959 | A1 | 5/2003 | Spencer et al. | |
| 2003/0182898 | A1 * | 10/2003 | Huppi et al. | 53/251 |
| 2005/0039417 | A1 * | 2/2005 | Liedtke et al. | 53/399 |
| 2013/0334008 | A1 * | 12/2013 | Overley et al. | 198/418 |

OTHER PUBLICATIONS

European Search Report dated Nov. 24, 2011 from counterpart foreign application.

* cited by examiner

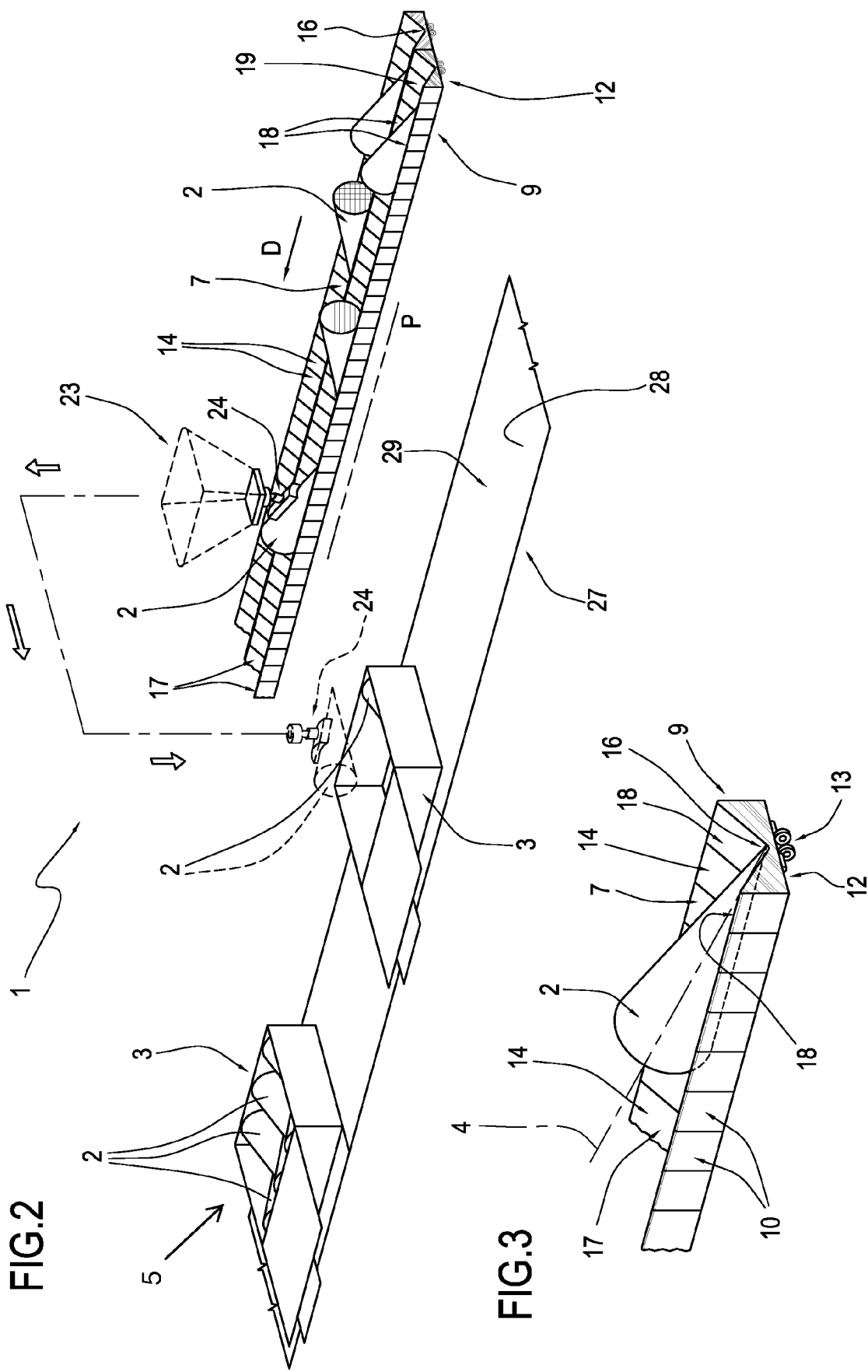

MACHINE FOR PACKAGING ARTICLES INSIDE CONTAINERS

This application claims priority to Italian Patent Application BO2010A000489 filed Jul. 30, 2010, the entirety of which is incorporated by reference herein.

The present invention relates to a machine for packaging articles inside containers.

More particularly, the machine according to the present invention is of the type comprising at least one conveyor provided with a longitudinally movable transporting section for feeding the articles in a given direction and along a given conveying path; a station for loading the articles onto the transporting section; sensor means arranged along the conveying path for detecting at least the position of each article on the transporting section; at least one robot arranged along the conveying path; control means connected to said sensor means and to said robot for imparting to the robot commands for picking up single articles from the transporting section and transferring each picked-up article inside a container.

A machine of this type is known, for example, from European patent EP 0856465 B1 in the name of Gerhard Schubert GmbH. In this machine, the articles are loaded in bulk onto the operative transporting section of a flat conveyor belt. Downstream of the loading station the position and direction of each article on the conveyor belt are then detected so that subsequently a robot, arranged along the conveying path downstream of the detection station, is able to pick up each article and then transfer it inside a container.

In a machine of this type, round articles, when resting on the conveyor belt with their convex surface, may start to roll in an undesirable manner on the belt between the moment when their position and direction are detected and the moment when they must be gripped by the robot. As a result the robot may not grip an article correctly or fail to grip it all.

The object of the present invention is to provide a machine for packaging articles inside containers which does not have the abovementioned drawback.

According to the present invention a machine for packaging articles inside containers is provided, said machine comprising the characteristic features present in one or more of the accompanying claims.

The technical features of the invention may be clearly determined from the contents of the accompanying claims and the advantages thereof will emerge more clearly from the detailed description which follows, with reference to the accompanying drawings which illustrate a purely exemplary and non-limiting embodiment thereof, where:

FIG. 2 shows schematically a perspective view of part of the machine shown in FIG. 1;

FIG. 3 shows a perspective view of a portion of a link conveyor forming part of the machine shown in FIG. 1;

FIGS. 4a-4d relate to respective variants, shown in cross-section, of the links of the conveyor according to FIG. 3.

Figure 1:
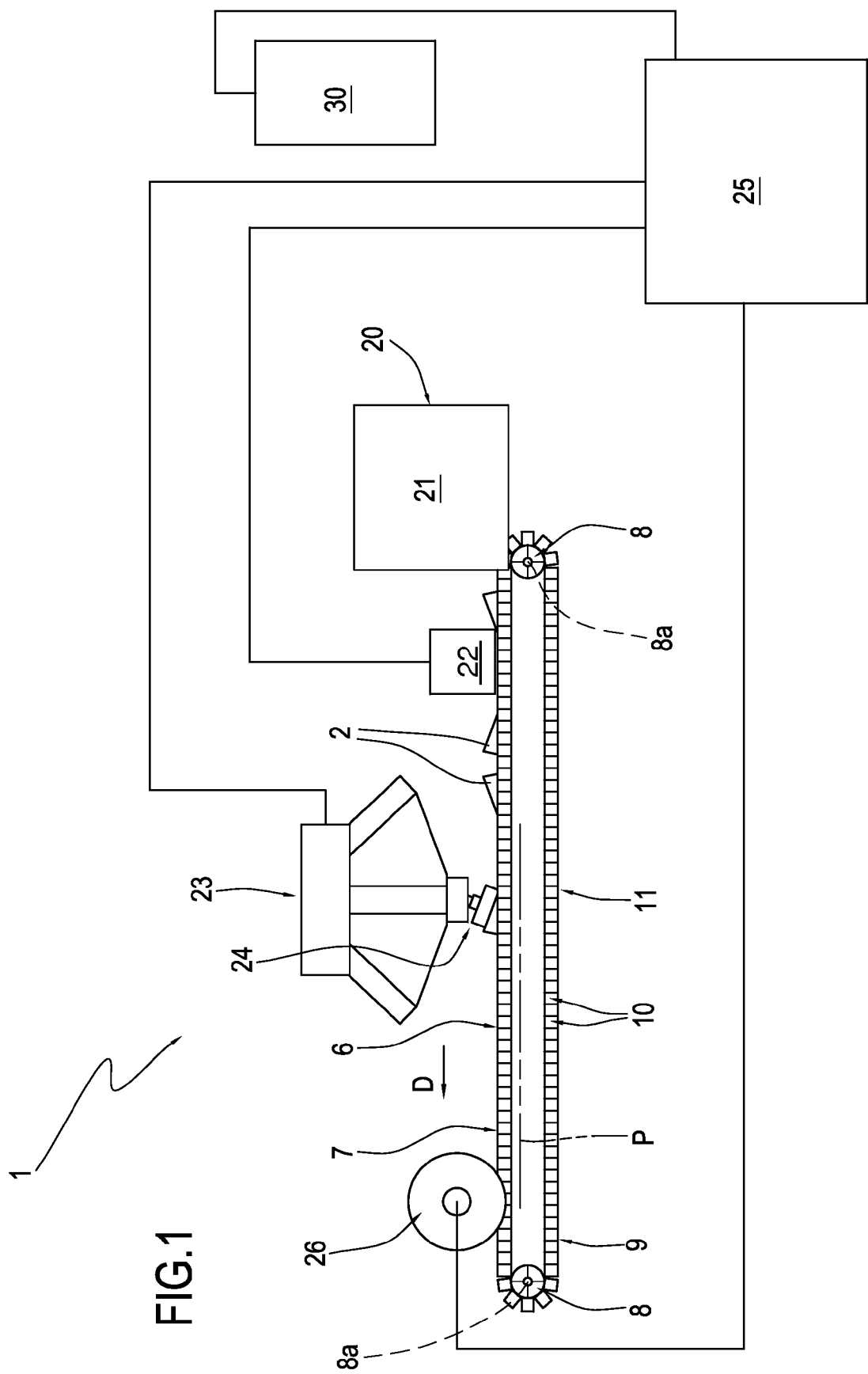
FIG. 1 shows schematically a front view, partially in block form, of a machine for packaging articles inside containers, provided in accordance with the present invention.

In FIGS. 1 and 2, the reference number 1 denotes in its entirety a machine for packaging articles 2 inside containers 3.

The articles 2 are preferably, but not exclusively, food products. In this example the articles 2 consist of ice-cream cones 2 with a long, more precisely conical, shape and a main longitudinal axis 4 of extension.

The containers 3 are preferably, but not exclusively, cardboard boxes 3.

The articles 2 are packaged, preferably but not exclusively, in orderly groups 5 inside respective containers 3.

In the example shown, the machine 1 is suitable for performing automatic packaging of ice-cream cones 2 inside cardboard boxes 3 inside each of which a group 5 of cones 2 is arranged in an orderly manner.

According to a preferred mode of packaging in one or two layers, the cones 2 alongside each other within each layer are arranged in a direction rotated through 180° with respect to each other. In the case of more than one layer, the vertically aligned cones 2 of two superimposed layers are arranged in a direction rotated through 180° with respect to each other.

In both cases, the cones 2 are inserted in an orderly and predetermined manner inside the box 3 so as to fill the box 3 wasting as little space as possible.

The machine comprises at least one conveyor 6 which is provided with a longitudinally movable transporting section 7 for feeding the articles 2 in a given direction D and along a given rectilinear conveying path P.

The conveyor 6 comprises at least two pulleys 8 with a horizontal axis 8a, at least one of which is a driving pulley, and a chain 9 with links 10 wound endlessly around the pulleys 8.

In the example shown the pulleys 8 are two in number and arranged at the same height.

Between the two pulleys 8, the chain 9 defines, at the top, the said transporting section 7 and, at the bottom, a return section 11.

The transporting section 7 is horizontal. Preferably, the return section 11 is also horizontal.

The links 10 are preferably made of plastic.

Figure 3A:
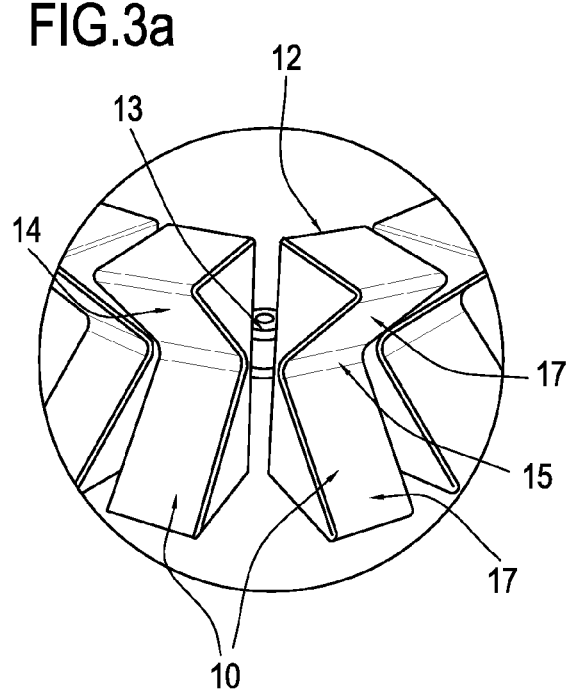
FIGS. 3a and 3b show a perspective view, from above and below, respectively, of a section of the conveyor shown in FIG. 3.
Figure 3B:
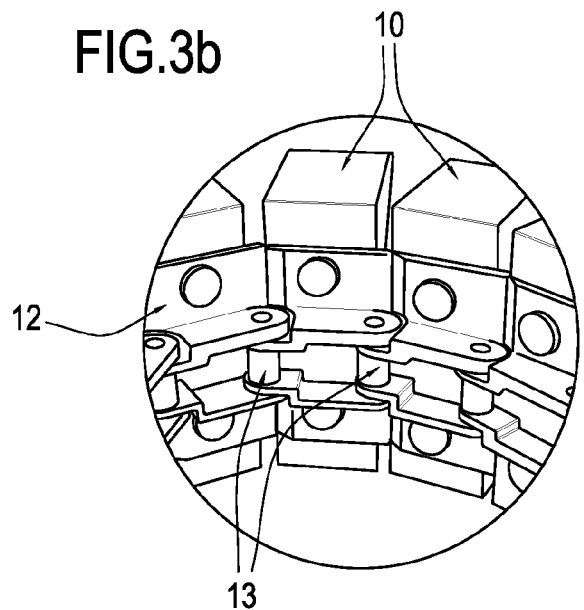

The links 10 are hinged with each other along a bottom wall 12 thereof by means of respective cylindrical hinges 13 parallel to the axis 8a of the pulleys 8 (FIGS. 3a and 3b).

In this way the links 10 are able to rotate relative to each other, opening out in fan fashion, along the winding arc around the pulleys 8, but are arranged alongside, in contact with each other, along the sections 7 and 11. More precisely, along the sections 7 and 11 the adjacent links 10 have their outer walls 14, i.e. the walls which support the product 2 and are situated opposite to the bottom walls 12, arranged alongside each other so as to form a substantially continuous surface.

On the transporting section 7, each link 10 of the chain 9 defines a respective basic portion 15 of the bottom 16 of the transporting section 7 itself.

Two side shoulders 17, which are flared relative to each other, project from the portion 15 and define with the bottom portion 15 the said outer wall 14.

On the transporting section 7, the shoulders 17 of the adjacent links 10 define, with a substantially continuous surface, two side walls 18 of the transporting section 7 itself.

The side walls 18 delimit transversely the transporting section 7, are parallel to each other and movable in the conveying direction D and mutually converge towards the bottom 16 of the transporting section 7, transversely relative to the conveying direction D.

The side walls 18 extend with a continuous surface from the bottom 16 of the transporting section 7 and define transversely a groove 19 or concavity 19 for receiving the articles 2.

Figure 4A:
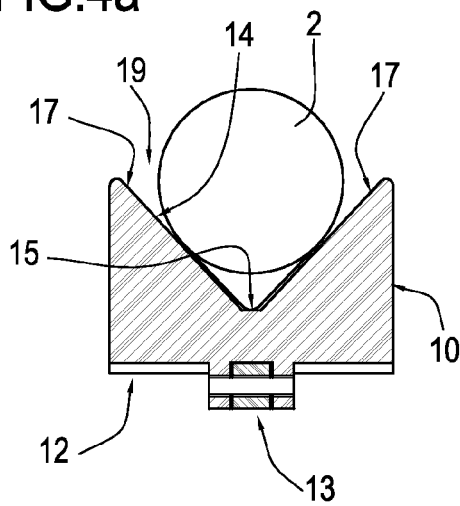
Figure 4B:
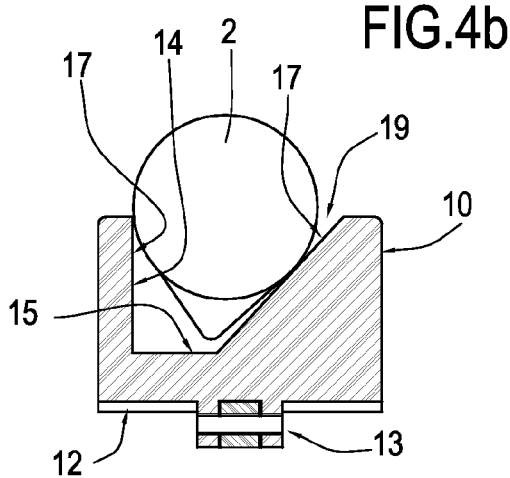
Figure 4C:
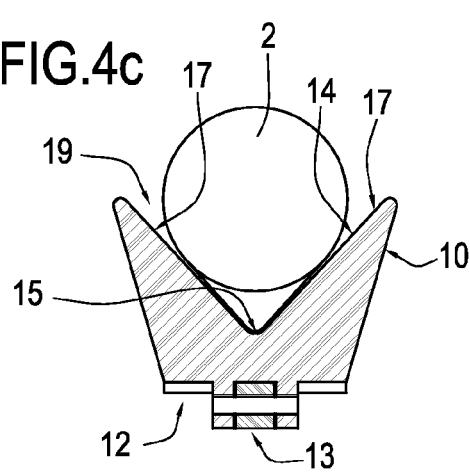

The groove 19 and the links 10 have, in cross-section, a substantially triangular shape, as illustrated more clearly in FIG. 4c.

Figure 4D:
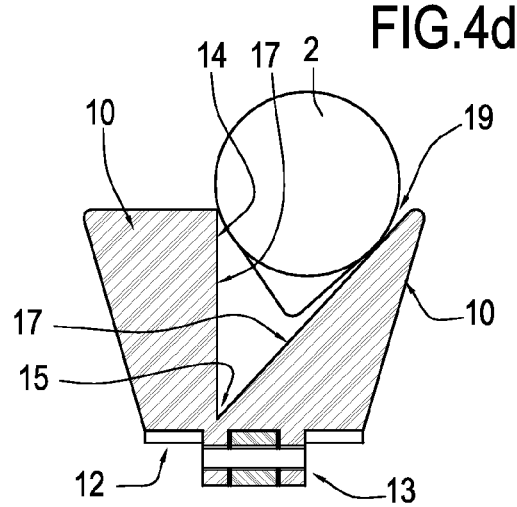

FIG. 4d shows a variation of embodiment of the cross-section of the links 10 and the groove 19 shown in FIG. 4c. In this case, the groove 19 and the links 10 have, in cross-section, a substantially triangular shape which is asymmetrical instead of symmetrical.

According to a further variant, shown in FIG. 4a, the groove 19 and the links 10 have, in cross-section, a substantially trapezoidal shape.

FIG. 4b shows a variation of embodiment of the cross-section of the links 10 and the groove 19 shown in FIG. 4a. In this case, the groove 19 and the links 10 have, in cross-section, a substantially trapezoidal shape which is asymmetrical instead of symmetrical.

The machine 1 also comprises a station 20 for loading the articles 2 onto the transporting section 7. The loading station 20 comprises a feed unit 21 for loading the articles 2 one behind another in a row onto the transporting section 7.

On the transporting section 7 the articles 2 may be arranged at a constant interval or at a random distance from each other along the row.

Once arranged on the conveyor 6, the articles 2 are stably seated between the walls 18 one behind another in the conveying direction D. In other words, the side walls 18, by retaining the articles 2 inside the groove 19, act as elements for stabilising the position and direction of each article 2 with respect to the transporting section 7.

Generally, the articles 2 are varyingly spaced from each other along the conveying path P and may be arranged in the same direction or have, in an alternating or random manner, a direction rotated through 180° with respect to the other adjacent article in the row.

The machine 1 also comprises sensor means 22 arranged along the conveying path P for detecting at least the position of each article 2 on the transporting section 7.

In the case where the articles 2 are all arranged in the same direction on the transporting section 7, the sensor means 22 may comprise a simple photocell; in the case where the articles 2 have, in an alternating or random manner, a direction rotated through 180° with respect to the other adjacent article in the row, the sensor means 22 preferably comprise a telecamera able to detect both the position and the direction of each article 2.

The machine 1 also comprises at least one robot 23 arranged along the conveying path P. The robot 23 comprises a movable gripping head 24 which has a component of movement directed along the transporting section 7 parallel to the conveying direction D.

The gripping head 24 comprises preferably at least two gripping jaws which are coordinated with the sucking action of a suction mouth. The gripping head 24 is also motor-driven so as to be able to rotate about an axis perpendicular to the conveying plane of the articles 2, so as to be able to pick up the articles 2 independently of their direction within the groove 19.

The machine 1 also comprises control means 25 which are connected to the sensor means 22 and to the robot 23 as well as to an encoder 26 of the conveyor 6 and are intended to impart to the robot 23 commands for picking up single articles 2 from the transporting section 7 and transferring each picked-up article 2 inside a container 3.

The encoder 26 provides information as to the position of the transporting section 7 and, independently of the speed of the latter, allows one to determine the position of each article 2 on the section 7 and monitor the article 2 during gripping thereof.

The control means 25 are connected via an Ethernet or other type of network to a central management unit 30.

In accordance with that shown in FIG. 2, the containers 3 are fed in succession towards the operating area of the robot 23 by means of a conveyor 27.

The conveyor 27 comprises two pulleys (not shown) with a horizontal axis, at least one of which is the driving pulley, and a belt 28 wound endlessly around the pulleys.

Between the two pulleys, the belt 28 defines, at the top, a transporting section 29 and, at the bottom, a return section (not shown).

The transporting section 29 is horizontal and extends parallel to the transporting section 7. Preferably, the sections 7 and 29 are arranged at the same height.

The sections 7 and 29 may be moved in the same direction or in a contrary sense, i.e. in opposite directions.

In the case where the articles 2 must be packaged in orderly groups inside respective containers 3, the control means 25 are programmed to impart to the robot 23 commands for picking up single articles 2 from the transporting section 7 and transferring each picked-up article 2 into the same container 3 until a predetermined number n of inserted articles 2, defining a group, is reached inside the said container 3.

During operation, the articles 2, although resting on the transporting section 7 with a convex surface thereof, more specifically with their conical side surface, are unable to roll in an undesirable manner on the transporting section 7 between the moment when their position and, if applicable, direction are detected and the moment when they must be gripped by the robot 23. This is ensured by the fact that each article 2 is retained, with contact, between the shoulders 17 of the links 10, or in other words between the side walls 18, in a stable fixed position on the transporting section 7. In particular, each article 2 is stably seated inside the groove 19 with its longitudinal axis 4 aligned with the conveying direction D.

It is evident that, in the case where the sensor means 22 comprise a telecamera, the latter may provide the control means 25 also with information relating to the form and/or quality and/or type of article 2. In the specific case of the example shown, the control means 25 may impart to the robot 23 a discard command in the case where the cone 2 to be picked up has been detected as being defective or may impart to the robot 23 a command for performing transfer to different containers depending on the flavour of the cone 2, in the case where the conveyor 6 is supplied with cones 2 of varying flavours.

It should also be pointed out that the side walls 18 described above as forming an integral part of the transporting section 7 of the conveyor 6 could also be formed, in a technically equivalent manner, as separate elements provided that they are movable in synchronism with the transporting section 7. For example, each wall 18 could be defined by a belt wound around respective inclined-axis pulleys and driven in synchronism with a conveyor belt defining the abovementioned transporting section.

The invention may obviously be implemented on an industrial level; moreover it may be subject to numerous modifications and variations all falling within the scope of the inventive idea; all the details may be replaced moreover by technically equivalent elements.

The invention claimed is:

1. A machine for packaging articles inside containers, comprising:
   at least one conveyor provided with a longitudinally movable transporting section including at least one conveying channel for feeding the articles in a given direction and along a given conveying path;
   a station for loading the articles onto the transporting section;

a sensor arranged along the conveying path for detecting at least a position of each article on the transporting section;

at least one robot arranged along the conveying path;

a control mechanism connected to the sensor and to the robot for imparting to the robot commands for picking up single articles from the transporting section and transferring each picked-up article inside a container;

wherein, a conveying channel of the transporting section is delimited transversely by two side walls for contacting opposing sides of each article to stabilize the position and direction of each article with respect to the transporting section so the articles are stably seated on the transporting section between the side walls, with the articles aligned one directly behind another in a row in the conveying direction;

wherein the two side walls are movable along the conveying direction;

wherein the conveyor comprises at least one chain wound in a conveying loop around two pulleys and a plurality of links hinged to the at least one chain and placed adjacent to each other such that shoulders of the plurality of links define the two side walls, wherein gaps are open between the shoulders of the plurality of links when the plurality of links are in an arc portion of the loop and wherein, when the plurality of links are in a straight upper portion of the transporting section, there are no gaps between the shoulders of directly adjacent links;

wherein the transporting section includes a plurality of adjacent parallel conveying channels extending along the conveying path defined by the plurality of links positioned adjacent to each other.

2. The machine of claim 1, wherein the side walls mutually converge towards a bottom of the transporting section, transversely relative to the conveying direction.

3. The machine of claim 2, wherein the side walls extend with a continuous surface from the bottom of the transporting section.

4. The machine of claim 1, wherein the side walls transversely define a groove for receiving the articles; each article being retained, with contact, between the side walls in a stable and fixed position on the transporting section.

5. The machine of claim 4, wherein the groove has, in cross-section, a substantially triangular shape.

6. The machine of claim 4, wherein groove has, in cross-section, a substantially trapezoidal shape.

7. The machine of claim 1, in which each article has an elongated form and a main longitudinal axis of extension, and wherein the side walls define transversely a groove inside which each article is stably seated with its longitudinal axis aligned with the conveying direction.

8. The machine of claim 1, wherein the conveyor comprises at least two pulleys, at least one of the at least two pulleys is a driving pulley; the chain defining, at a top, the transporting section and, at a bottom, a return section.

9. The machine of claim 1, wherein the loading station comprises a feed mechanism for loading the articles one behind another in a row onto the transporting section.

10. The machine of claim 1, wherein the robot comprises a movable gripping head which has a component of movement directed along the transporting section parallel to the conveying direction.

11. The machine of claim 1, wherein the control mechanism is programmed to impart to the robot commands for picking up single articles from the transporting section and transferring each picked-up article into a container until a predetermined number of transferred articles, defining a group, is reached inside the container.

12. The machine of claim 11, wherein each link of the chain defines a respective basic portion of the bottom and the side walls.

13. The machine of claim 1, wherein the side walls are parallel to each other and movable in the conveying direction.

* * * * *